US011383559B2

(12) United States Patent
Iwamoto

(10) Patent No.: US 11,383,559 B2
(45) Date of Patent: Jul. 12, 2022

(54) PNEUMATIC TIRE

(71) Applicant: SUMITOMO RUBBER INDUSTRIES, LTD., Hyogo (JP)

(72) Inventor: Naoki Iwamoto, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 132 days.

(21) Appl. No.: 16/885,998

(22) Filed: May 28, 2020

(65) Prior Publication Data

US 2020/0406688 A1 Dec. 31, 2020

(30) Foreign Application Priority Data

Jun. 25, 2019 (JP) ............................ JP2019-117668

(51) Int. Cl.
*B60C 13/00* (2006.01)
*B60C 13/02* (2006.01)
*B60C 11/03* (2006.01)

(52) U.S. Cl.
CPC .............. *B60C 13/02* (2013.01); *B60C 11/03* (2013.01); *B60C 13/002* (2013.01); *B60C 13/004* (2013.01); *B60C 2011/0367* (2013.01); *B60C 2011/0379* (2013.01); *B60C 2200/04* (2013.01); *B60C 2200/14* (2013.01)

(58) Field of Classification Search
CPC ........ B60C 13/002; B60C 13/00; B60C 13/02
See application file for complete search history.

(56) References Cited

U.S. PATENT DOCUMENTS

2010/0288409 A1 11/2010 Ohara
2019/0299719 A1* 10/2019 Murata .................. B60C 11/03

FOREIGN PATENT DOCUMENTS

JP 2010-264962 A 11/2010

* cited by examiner

*Primary Examiner* — Cedrick S Williams
(74) *Attorney, Agent, or Firm* — Greenblum & Bernstein, P.L.C.

(57) ABSTRACT

A tire includes side protectors arranged in a sidewall portion. Each of the side protectors is provided with a groove. The groove includes a first inclined groove portion inclined to a first side with respect to the tire radial direction, or a second inclined groove portion inclined to a second side opposite to the first side with respect to the tire radial direction. The side protectors include first protectors each provided with the first inclined groove portion, and second protectors each provided with the second inclined groove portion.

18 Claims, 6 Drawing Sheets

PNEUMATIC TIRE

TECHNICAL FIELD

The present invention relates to a pneumatic tire.

BACKGROUND ART

Patent Document 1 shown below has described an off-the-road pneumatic radial tire. Sidewall portions of the pneumatic radial tire is provided with a plurality of radial protrusions arranged at intervals in a tire circumferential direction and gap portions formed in a groove shape between the radial protrusions.

PRIOR ART DOCUMENT

Patent Document

[Patent Document 1]

Japanese Unexamined Patent Application Publication No. 2010-264962

SUMMARY OF THE INVENTION

Problems to be Solved by the Invention

In the pneumatic tire of the Patent Document 1, there is room for improvement in increasing off-road performance on a muddy road or the like.

The present invention was made in view of the above, and a primary object thereof is to provide a pneumatic tire capable of improving the off-road performance.

Means for Solving the Problems

The present invention is a pneumatic tire including a tread portion and a pair of sidewall portions each extending inward in a tire radial direction from the tread portion, wherein at least one of the pair of the sidewall portions is provided with side protectors protruding outward in a tire axial direction and arranged in a tire circumferential direction, each of the side protectors is provided with a groove, the groove includes a first inclined groove portion inclined to a first side with respect to the tire radial direction, or a second inclined groove portion inclined to a second side opposite to the first side with respect to the tire radial direction, and the side protectors include first protectors each provided with the first inclined groove portion, and second protectors each provided with the second inclined groove portion.

In the pneumatic tire according to the present invention, it is preferred that the first protectors and the second protectors are arranged alternately.

In the pneumatic tire according to the present invention, it is preferred that the groove includes an outer groove portion arranged radially outside the first inclined groove portion or the second inclined groove portion, and the outer groove portion has an angle smaller than the first inclined groove portion and the second inclined groove portion with respect to the tire radial direction.

In the pneumatic tire according to the present invention, it is preferred that the outer groove portion is connected with the first inclined groove portion or the second inclined groove portion in a bent manner.

In the pneumatic tire according to the present invention, it is preferred that the outer groove portion is provided in a central portion in the tire circumferential direction of the side protector.

In the pneumatic tire according to the present invention, it is preferred that each of the side protectors includes a V-shaped inner edge protruding radially inward.

In the pneumatic tire according to the present invention, it is preferred that the groove is connected with the inner edge.

In the pneumatic tire according to the present invention, it is preferred that the inner edge includes a first edge portion inclined to the first side with respect to the tire radial direction and a second edge portion inclined to the second side with respect to the tire radial direction, and the first inclined groove portion is connected with the second edge portion.

In the pneumatic tire according to the present invention, it is preferred that the second inclined groove portion is connected with the first edge portion.

In the pneumatic tire according to the present invention, it is preferred that in a tire meridian section passing through a tire rotational axis, each of the side protectors has an outer surface including an outer surface portion, an inner surface portion, and an angle changing surface portion, the outer surface portion extends at a first angle with respect to the tire axial direction, the inner surface portion is arranged radially inside the outer surface portion and extends at a second angle different from the first angle, and the angle changing surface portion connects the outer surface portion and the inner surface portion, and has an angle changing between them with respect to the tire radial direction.

In the pneumatic tire according to the present invention, it is preferred that the first angle is 60 degrees or more and 80 degrees or less, and the second angle is 85 degrees or more and 100 degrees or less.

In the pneumatic tire according to the present invention, it is preferred that the angle changing surface portion includes a first angle changing surface portion and a second angle changing surface portion having a radial position different from the first angle changing surface portion, and the groove extends between the first angle changing surface portion and the second angle changing surface portion.

In the pneumatic tire according to the present invention, it is preferred that a distance in the tire radial direction between a radially outer end of each of the side protectors and a tread edge is 3% or more and 10% or less of the tire section height.

Effects of the Invention

The pneumatic tire according to the present invention has the side protectors arranged in at least one of the sidewall portions. The side protectors include the first protectors each provided with the first inclined groove portion inclined to the first side with respect to the tire radial direction and the second protectors each provided with the second inclined groove portion inclined to the second side with respect to the tire radial direction.

The first inclined groove portions exert high shearing force during one of driving and braking when running off-the-road on a muddy ground and the like. Further, the first protectors which are provided with the first inclined groove portions have high rigidity during one of driving or braking. The first inclined groove portions and the first protectors configured as such increase one of traction or braking force. On the other hand, the second inclined groove portions exert high shearing force against mud and soil during the other one of driving and braking. Further, the second protectors which are provided with the second inclined groove portions have high rigidity during the other one of driving or braking. The second inclined groove portions and the second protectors increase the other one of the traction and the braking force. As just described, the side protectors having the first protectors and the second protectors improve running performance during driving and braking. Therefore, the pneumatic tire according to the present invention exert excellent off-road performance.

MODE FOR CARRYING OUT THE INVENTION

An embodiment of the present invention will now be described in conjunction with accompanying drawings.

Figure 1:
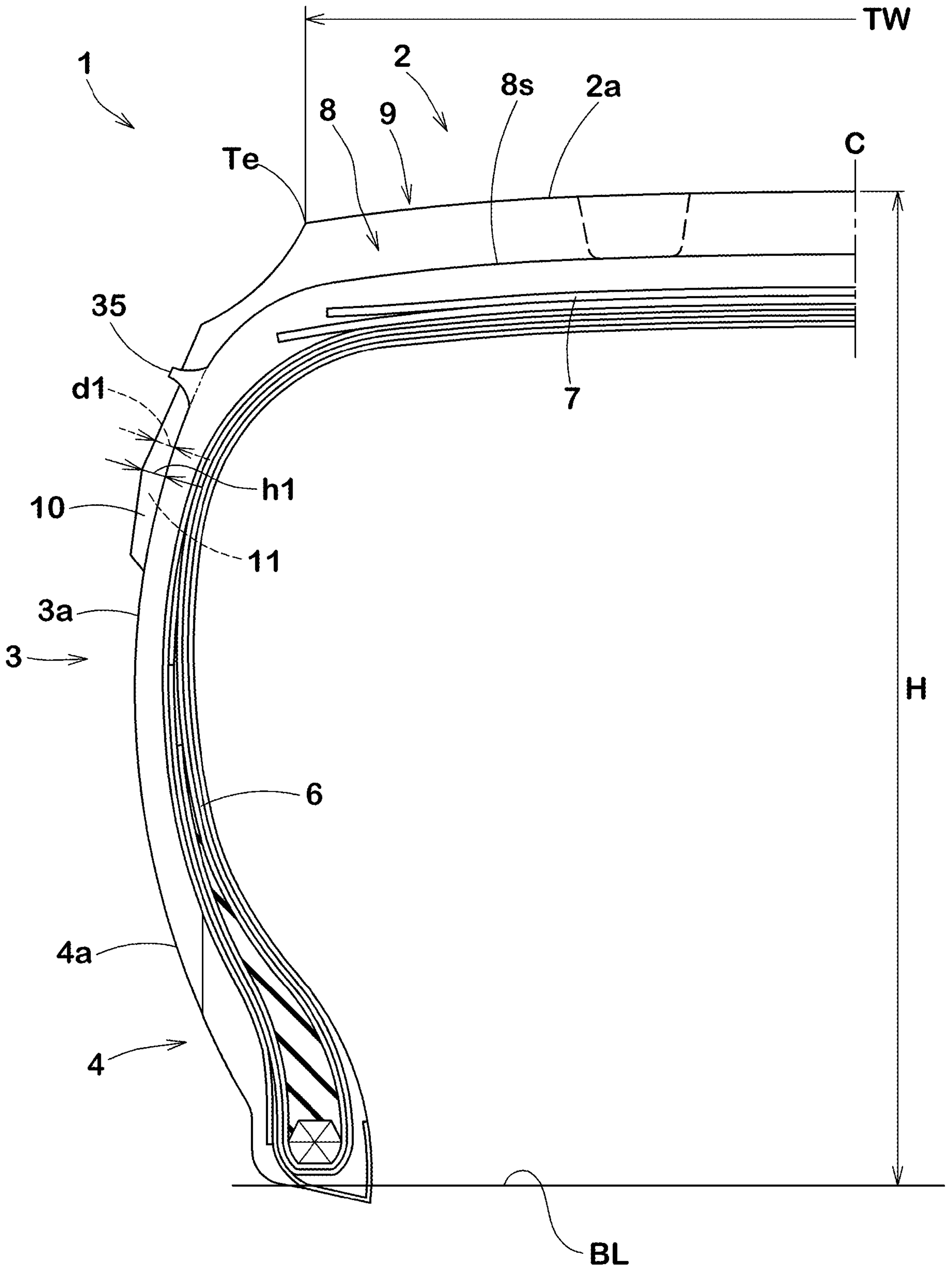
FIG. 1 a tire meridian section of a pneumatic tire according to an embodiment of the present invention.

FIG. 1 is a tire meridian section passing through a tire rotational axis (not shown) of a pneumatic tire (hereinafter, may be simply referred to as "tire") 1 showing an embodiment of the present invention in a standard state. FIG. 1 shows, as a preferred embodiment, the tire 1 for a passenger car that is suitably mounted on a 4WD car or the like that can run on an off-the-road surface such as muddy roads or rocky roads. However, the present invention can also be applied to the tire 1 for heavy loads, for example.

The "standard state" is a state in which the tire 1 is mounted on a standard rim (not shown), inflated to a standard inner pressure, and loaded with no tire load. Dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in IRA, and "INFLATION PRESSURE" in ETRTO.

The tire 1 includes a tread portion 2 having a ground contacting surface (2*a*) which comes into contact with a road surface, a pair of sidewall portions 3 extending inwardly in a tire radial direction from both ends in a tire axial direction of the tread portion 2, and a pair of bead portions 4 each extending radially inward from a respective one of the sidewall portions 3, for example. In the present specification, each of the sidewall portions 3 refers to a region radially inward of a respective one of tread edges (Te) of the tread portion 2.

The "tread edges (Te)" mean axially outermost ground contacting positions of the tire 1 when the tire 1 in the standard state is in contact with a flat surface with zero camber angle by being loaded with a standard tire load. A distance in the tire axial direction between the tread edges (Te) on both sides in the tire axial direction is a tread width (TW).

The "standard tire load" is a tire load specified for the concerned tire by a standard included in a standardization system on which the tire is based, the "maximum load capacity" in JATMA, maximum value listed in "TIRE LOAD LIMITS AT VARIOUS COLD INFLATION PRESSURES" table in IRA, and "LOAD CAPACITY" in ETRTO.

In the present embodiment, tire components including a carcass 6 extending between the pair of the bead portions 4 and a belt layer 7 disposed in the tread portion 2 are arranged inside the tire 1. Known components are appropriately used for these tire components.

At least one of the pair of the sidewall portions 3 is formed with side protectors 10 that protrude axially outward. The side protectors 10 in the present embodiment are provided on both of the sidewall portions 3.

Figure 2:
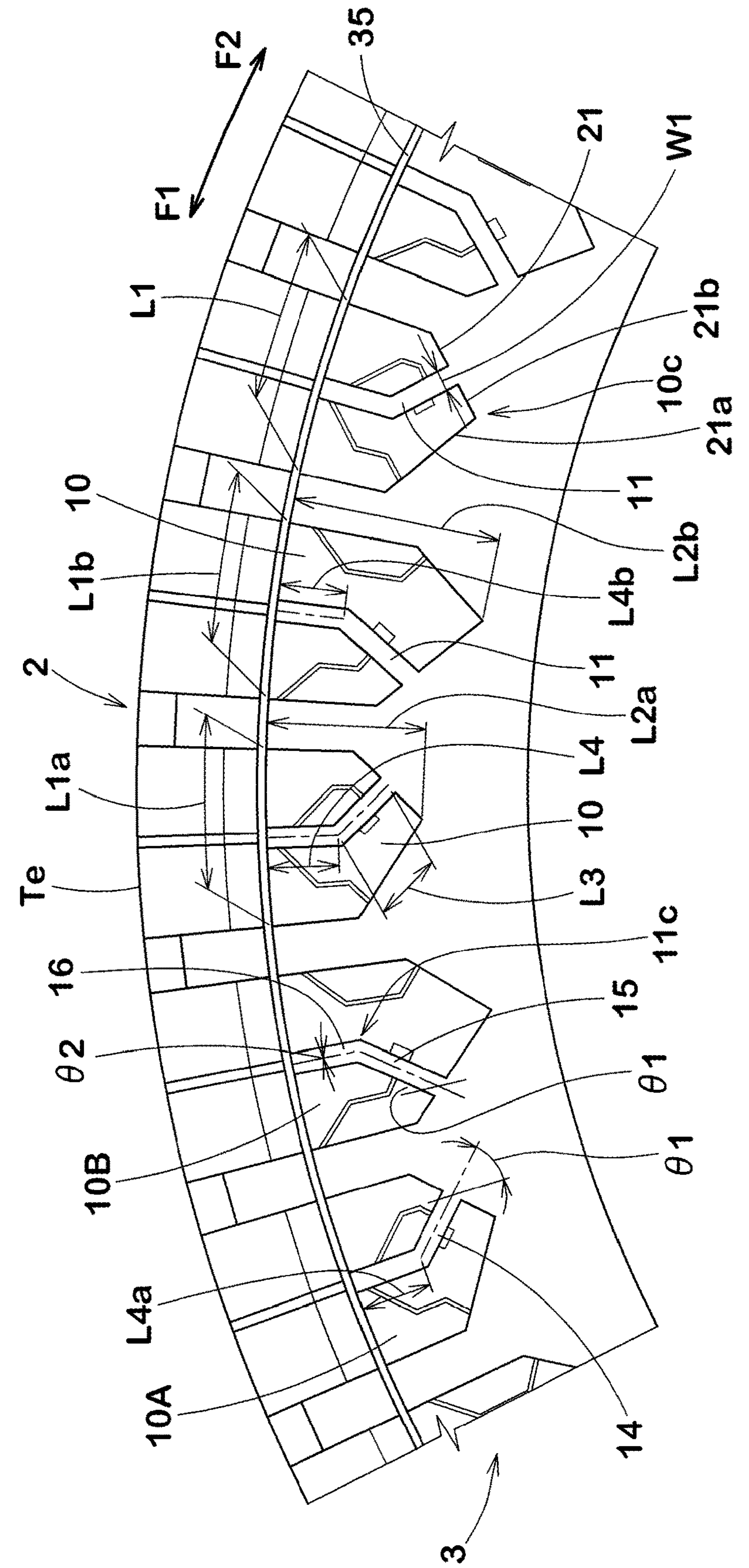
FIG. 2 a front view of the sidewall portion.

FIG. 2 is a front view of one of the sidewall portions 3 of FIG. 1. As shown in FIG. 2, the side protectors 10 are arranged in the tire circumferential direction. Further, each of the side protectors 10 of the present embodiment is provided with a groove 11.

The grooves 11 in the present embodiment include first inclined groove portions 14 inclined to a first side (F1) (left side in the drawing) with respect to the tire radial direction, and second inclined groove portions 15 inclined to a second side (F2) (right side in the drawing) which is opposite to the first side (F1) with respect to the tire radial direction. The first inclined groove portions 14 in the present embodiment are inclined to the first side (F1) as they go radially outward. The second inclined groove portions 15 in the present embodiment are inclined to the second side (F2) as they go radially outward. The first inclined groove portions 14 configured as such exert high shearing force on mud and the like during one of driving and braking. Further, the second inclined groove portions 15 exert high shearing force on mud and the like during the other one of driving and braking.

The side protectors 10 include first protectors (10A) provided with the first inclined groove portions 14, and second protectors (10B) provided with the second inclined groove portions 15. The first protectors (10A) have high rigidity in one of driving or braking. The second protectors (10B) have high rigidity in the other one of driving or braking. As just described, the first inclined groove portions 14 and the first protectors (10A) increase one of traction or braking force. Further, the second inclined groove portions 15 and the second protectors (10B) increase the other one of the traction and the braking force. Therefore, the side protectors 10 having the first protectors (10A) and the second protectors (10B) improve running performance during driving and braking when running off-the-road.

The first protectors (10A) and the second protectors (10B) in the present embodiment are arranged alternately. Thereby, the above-described effects are exerted more effectively.

As shown in FIG. 1, in the present embodiment, the side protectors 10 protrude from an outer surfaces (3*a*) of the sidewall portions 3. Each of the outer surfaces (3*a*) smoothly extends radially inwardly from groove bottoms (8*s*) of tread grooves 8 extending axially inside and outside a respective one of the tread edges (Te) to be continuous with an outer surface (4*a*) of a respective one of the bead portions 4, for example. The outer surfaces (3*a*) exclude local protrusions (including circumferential protrusions 35 described later) including embossed marks such as marks, and uneven patterns, for example.

Figure 3:
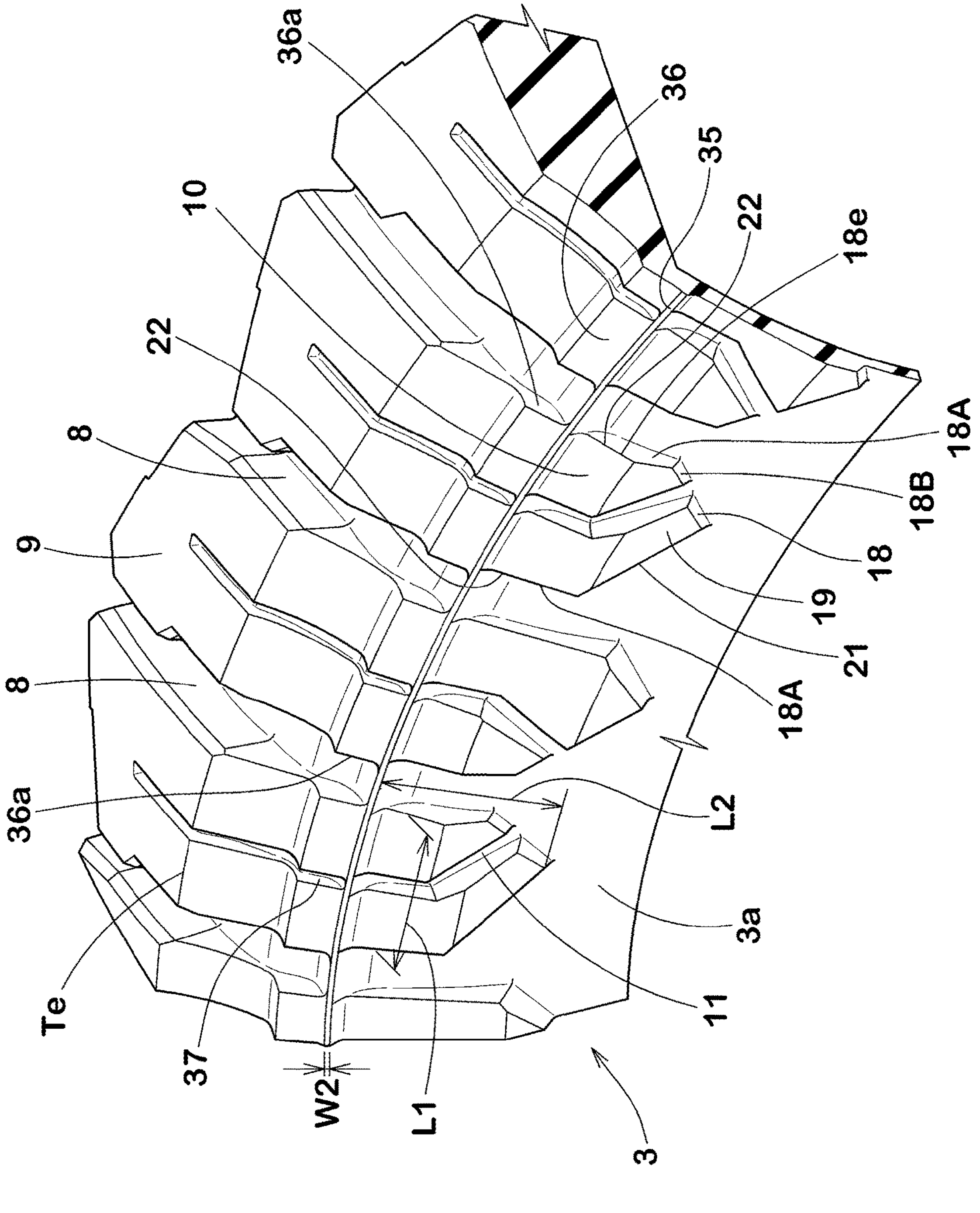
FIG. 3 a perspective view of the sidewall portion.

FIG. 3 is a perspective view of one of the sidewall portions 3. As shown in FIG. 3, in the present embodiment, each of the side protectors 10 includes wall surfaces 18 rising from the outer surface (3*a*) and an outer surface 19 surrounded by axially outer edges (18*e*) of the wall surfaces 18. The wall surfaces 18 include a pair of radial surface portions (18A) extending in the tire radial direction and spaced apart in the tire radial direction, and a circumferential surface portion (18B) provided radially inside the pair of the radial surface portions (18A). The circumferential surface portion (18B) extends in a tire circumferential direction so as to connect the radial surface portions (18A). It should be noted that the side protectors 10 are not limited to such an embodiment, they may be formed by only the outer surface 19 extending gently and axially outwardly from the outer surface (3*a*) without having the wall surfaces 18 (this embodiment not shown), for example. It should be noted that, in the side protectors 10 of FIG. 3, cut-out portions 12 and sipes 13 described later are omitted for convenience.

Each of the side protectors 10 includes a V-shaped inner edge 21 protruding radially inward, and a pair of outer edges 22 arranged on both sides in the tire circumferential direction of the inner edge 21 and radially outside the inner edge 21, for example. The outer edges 22 are connected with the inner edge 21 and extend in the tire radial direction, for example. The outer edges 22 are edges formed between the radial surface portions (18A) and the outer surface 19 in the present embodiment. The inner edge 21 is an edge formed between the circumferential surface portion (18B) and the outer surface 19 in the present embodiment.

Each of the side protectors 10 of the present embodiment is formed in a substantially pentagonal shape. The side protectors 10 are not limited to such an embodiment, and may have other polygonal shapes including a square shape and a triangular shape, for example. Further, the side protectors 10 may have elliptical or other shapes, for example.

Although not particularly limited, in order to increase the off-road performance, it is preferred that each of circumferential lengths (L1) of the side protectors 10 is 75% or more and 125% or less of each of radial lengths (L2) of the side protectors 10.

As shown in FIG. 2, the inner edge 21 in the present embodiment includes a first edge portion (21*a*) inclined to the first side (F1) and a second edge portion (21*b*) inclined to the second side (F2). The first edge portion (21*a*) is inclined to the first side (F1) as it goes radially outward, for example. The second edge portion (21*b*) is inclined to the second side (F2) as it goes radially outward, for example. The first edge portion (21*a*) and the second edge portion (21*b*) are connected at a central portion (10*c*) in the tire circumferential direction of the side protector 10. The inner edge 21 configured as such exerts a high edge effect while maintaining the rigidity balance in the tire circumferential direction of the side protector 10. The "central portion (10*c*) in the tire circumferential direction of the side protector 10" is a central region when the side protector 10 is equally divided into three in the tire circumferential direction.

The first edge portions (21*a*), the second edge portions (21*b*), and the outer edges 22 in the present embodiment extend linearly. The first edge portions (21*a*), the second edge portions (21*b*), and the outer edges 22 configured as such increase the shearing force against mud and the like and maintain the rigidity of the side protectors 10 high. It should be noted that the first edge portions (21*a*), the second edge portions (21*b*), and the outer edges 22 are not limited to those extending linearly, but may extend in a wavy or zigzag shape.

It is preferred that each of angles θ1 with respect to the tire radial direction of the first inclined groove portions 14 and the second inclined groove portions 15 is 30 degrees or more and 60 degrees or less. If each of the angles θ1 is less than 30 degrees, it is possible that the shearing force during driving or braking is decreased. If each of the angles θ1 is more than 60 degrees, the centrifugal force during running of the tire 1 cannot be used, therefore, it is possible that the mud, soil, and the like which have entered the groove 11 are not easily discharged (hereinafter, referred to as "soil discharging performance"). The angles θ1 are the angles at radially inner ends of the first inclined groove portions 14 and the second inclined groove portions 15.

Each of the grooves 11 includes an outer groove portion 16 which is arranged radially outside the first inclined groove portion 14 or the second inclined groove portion 15. The outer groove portion 16 is inclined at an angle θ2 smaller than the first inclined groove portion 14 and the second inclined groove portion 15 with respect to the tire radial direction. The outer groove portions 16 configured as such are subjected to a large centrifugal force and has high soil discharging performance.

Each of the angles θ2 is preferably 10 degrees or less, and more preferably 5 degrees or less, for example.

Each of the outer groove portions 16 is connected to a respective one of the first inclined groove portions 14 or the second inclined groove portions 15 in a bent manner, for example. In other words, in the present embodiment, each of the grooves 11 is formed to include the outer groove portion 16, the first inclined groove portion 14 or the second inclined groove portion 15, and a bent portion (11*c*) connecting these. In the bent portion (11*c*) of each of the grooves 11, the rigidity of the side protector 10 is decreased and deformation during running is promoted, therefore, high soil discharging performance is exerted.

The first inclined groove portions 14, the second inclined groove portions 15, and the outer groove portions 16 extend linearly in the present embodiment. Thereby, higher soil discharging performance is exerted. It should be noted that the first inclined groove portions 14, the second inclined groove portions 15, and the outer groove portions 16 are not limited to those extending linearly, and may extend in a zigzag or wavy shape, for example.

The outer groove portion 16 is provided in the central portion (10*c*) in the tire circumferential direction of each of the side protectors 10. The outer groove portions 16 configured as such each maintain a high rigidity balance of the side protector 10 on both sides of the outer groove portion 16 and improve the off-road performance.

It is preferred that each of lengths (L4) of the outer groove portions 16 is 60% or more and 150% or less of each of lengths (L3) of the first inclined groove portions 14 or the second inclined groove portions 15. Thereby, the lengths of the outer groove portions 16, the first inclined groove portions 14, and the second inclined groove portions 15 are ensured in a good balance, therefore, the off-the-road running performance and the soil discharging performance during driving and braking are improved in a good balance. In order to effectively exert the above-described effects, it is preferred that a length (L4*a*) of the outer groove portion 16 of each of the first protectors (10A) is the same as a length (L4*b*) of the outer groove portion 16 of each of the second protectors (10B).

In each of the side protectors 10, the groove 11 is connected with the inner edge 21, for example. The groove 11 configured as such can smoothly discharge mud and the like caught in the groove 11 from the inner edge 21.

In the present embodiment, in each of the first protectors (10A), the first inclined groove portion 14 is connected to the second edge portion (21*b*) of the inner edge 21. The first inclined groove portion 14 is inclined to a side opposite to the second edge portion (21*b*). Thereby, in a part of the side protector 10 near the second edge portion (21*b*), decrease in the rigidity is suppressed, therefore, the off-road performance is maintained high. From the same point of view, in each of the second protectors (10B) in the present embodiment, the second inclined groove portion 15 is connected to the first edge portion (21*a*) inclined to a side opposite to the second inclined groove portion 15.

It is preferred that the first inclined groove portion 14 is connected to a central region obtained by equally dividing the second edge portion (21*b*) into three in its length direction. The first inclined groove portions 14 configured as such each maintain the rigidity of parts of the side protector 10 on both sides of the first inclined groove portion 14 in a good balance. Further, it is preferred that the second inclined groove portion 15 is connected to a central region obtained by equally dividing the first edge portion (21*a*) into three in its length direction.

It is preferred that each of widths (W1) of the grooves 11 is 5% or more and 20% or less of each of the lengths (L1) in the tire circumferential direction of the side protectors 10, for example. It is preferred that each of depths (d1) of the grooves 11 is 50% or more and 100% or less of each of rising heights (h1) (shown in FIG. 1) of the side protectors 10.

It is preferred that each of lengths (L1*a*) in the tire circumferential direction of the first protectors (10A) is 80% or more and 125% or less of each of lengths (L1*b*) in the tire circumferential direction of the second protectors (10B). It is preferred that each of lengths (L2*a*) in the tire radial direction of the first protectors (10A) is 60% or more and 180% or less of each of lengths (L2*b*) in the tire radial direction of the second protectors (10B).

Figure 4:
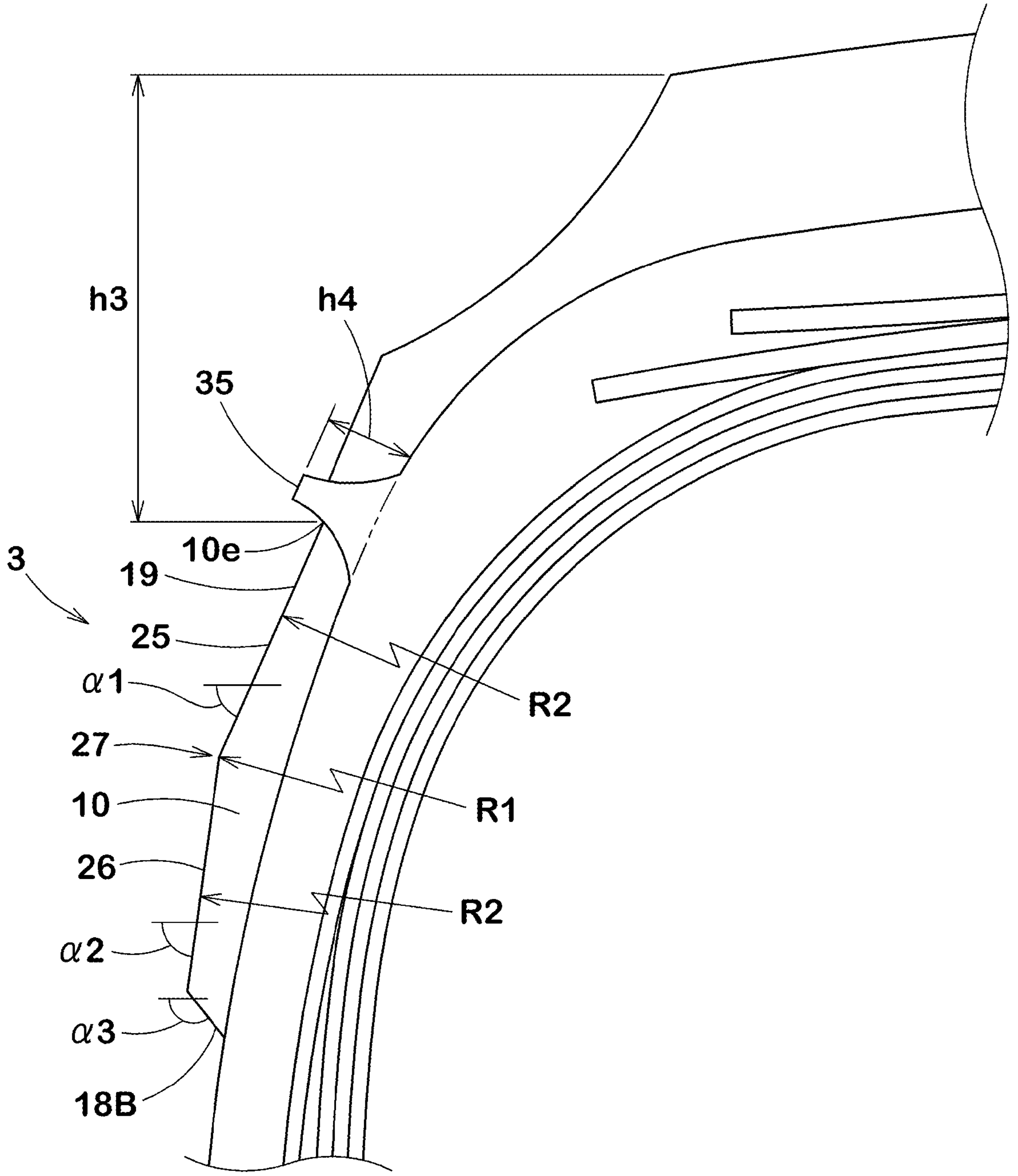
FIG. 4 an enlarged view of the sidewall portion of FIG. 1.

FIG. 4 is an enlarged view of FIG. 1. As shown in FIG. 4, in the tire meridian section, the outer surface 19 of each of the side protectors 10 includes an outer surface portion 25, an inner surface portion 26, and an angle changing surface portion 27. The outer surface portion 25 extends at a first angle (α1) with respect to the tire axial direction, for example. The inner surface portion 26 is arranged radially inside the outer surface portion 25 and extends at a second angle (α2) different from the first angle (α1), for example. The angle changing surface portion 27 connects the outer surface portion 25 and the inner surface portion 26, and the angle with respect to the tire radial direction changes between them, for example. The angle changing surface portion 27 configured as such increases the shearing force against mud and the like, therefore, the off-road performance is improved.

The angle changing surface portion 27 in the present embodiment refers to a region formed with a smaller radius of curvature than the outer surface portion 25 and the inner surface portion 26. The angle changing surface portion 27 is a region formed with a radius of curvature (R1) of less than 10 mm, and is preferably formed with the radius of curvature (R1) of 5 mm or less, for example. The outer surface portion 25 and the inner surface portion 26 are regions formed with a radius of curvature (R2) of 50 mm or more, and are preferably formed with the radius of curvature (R2) of 100 mm or more, for example.

It is preferred that the first angle (α1) is 60 degrees or more and 80 degrees or less. It is preferred that the second angle (α2) is 85 degrees or more and 100 degrees or less. If the first angle (α1) is more than 80 degrees, or if the second angle (α2) is less than 85 degrees, it is possible that the effect of increasing the shearing force by the angle changing surface portion 27 is decreased. Further, if the first angle (α1) is more than 80 degrees, when vulcanization molding the tire 1 by using a vulcanizing mold (not shown), for example, air in the vulcanizing mold becomes difficult to be discharged, therefore, it becomes necessary to provide many vent lines for discharging air. If the first angle (α1) is less than 60 degrees, or if the second angle (α2) is more than 100 degrees, the shearing force applied to the angle changing surface portion 27 becomes excessively large, therefore, it is possible that damage such as chipping and cracks is likely to occur in the angle changing surface portion 27. It should be noted that it is preferred that each of angles (α3) of the circumferential surface portions (18B) with respect to the tire axial direction is 120 degrees or more.

The outer surface portion 25 and the inner surface portion 26 may extend linearly or may extend in a smooth curved line in the tire meridian section.

Figure 5:
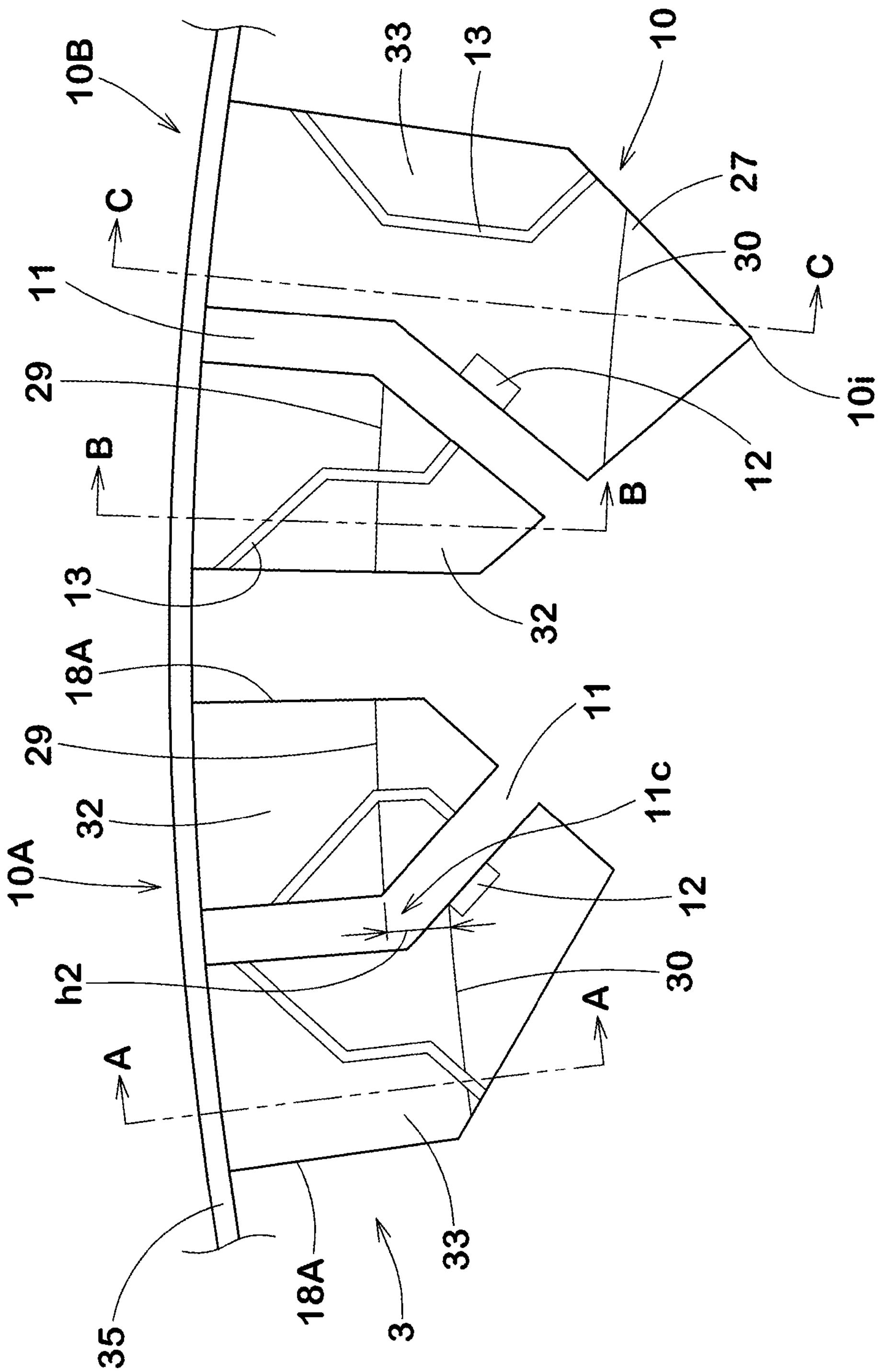
FIG. 5 an enlarged view of the sidewall portion of FIG. 2.

FIG. 5 is an enlarged view of the sidewall portion 3 of FIG. 2. As shown in FIG. 5, the angle changing surface portions 27 in the present embodiment includes first angle changing surface portions 29 and second angle changing surface portions 30 having radial positions different from the first angle changing surface portions 29. In the present specification, the second angle changing surface portions 30 are the angle changing surface portions 27 arranged radially inside the first angle changing surface portions 29.

In each of the side protectors 10 of the present embodiment, the groove 11 extends between the first angle changing surface portion 29 and the second angle changing surface portion 30. In other words, each of the side protectors 10 includes a first raised portion 32 provided with the first angle changing surface portion 29, and a second raised portion 33 provided with the second angle changing surface portion 30, and the first raised portion 32 and the second raised portion 33 are separated by the groove 11. As a result, large shearing force is applied to the two positions of the first angle changing surface portion 29 and the second angle changing surface portion 30 which are displaced in the tire radial direction, therefore, mud caught in the groove 11 is discharged by the large shearing force, thereby, the soil discharging performance of the tire 1 is improved.

Each of the first angle changing surface portions 29 is formed so as to extend in a respective one of the first raised portions 32 continuously in a tire circumferential direction, for example. The first angle changing surface portions 29 of each of the first raised portions 32 in the present embodiment extends continuously between the groove 11 and the radial surface portion (18A). Similarly, each of the second angle changing surface portions 30 is formed so as to extend in a respective one of the second raised portion 33 continuously in a tire circumferential direction, for example. The first angle changing surface portions 29 and the second angle changing surface portions 30 configured as such effectively exert the above-described effects.

It is preferred that in each of the side protectors 10, a radial distance (h2) between the first angle changing surface portion 29 and the second angle changing surface portion 30 is 10% or more and 50% or less of each of the radial lengths (L2) of the side protectors 10. If the distance (h2) is less than 10% of each of the radial lengths (L2) of the side protectors 10, the first angle changing surface portion 29 and the second angle changing surface portion 30 become close to each other, therefore, the locations where the shearing force is applied to become close, thereby, it is possible that the above-described improvement in the soil discharging performance cannot be expected. If the distance (h2) is more than 50% of each of the radial lengths (L2) of the side protectors 10, the second angle changing surface portion 30 become close to an inner end (10*i*) of the side protector 10, therefore, it is possible that the rigidity of the side protector 10 forming the inner surface portion 26 is excessively decreased.

The first angle changing surface portion 29 or the second angle changing surface portion 30 is arranged at the same height position in the tire radial direction as the bent portion (11*c*) of the groove 11. Thereby, mud and the like are discharged more smoothly in the bent portion (11*c*), therefore, the soil discharging performance is further improved. In each of the side protectors 10 of the present embodiment, the first angle changing surface portion 29 and the bent portion (11*c*) of the groove 11 are formed at the same height position.

It is preferred that each of the angle changing surface portions 27 extends in the tire circumferential direction at the constant radial position, for example. The angle changing surface portions 27 configured as such can exert large shearing force against mud and the like during off-the-road running.

Figure 6:
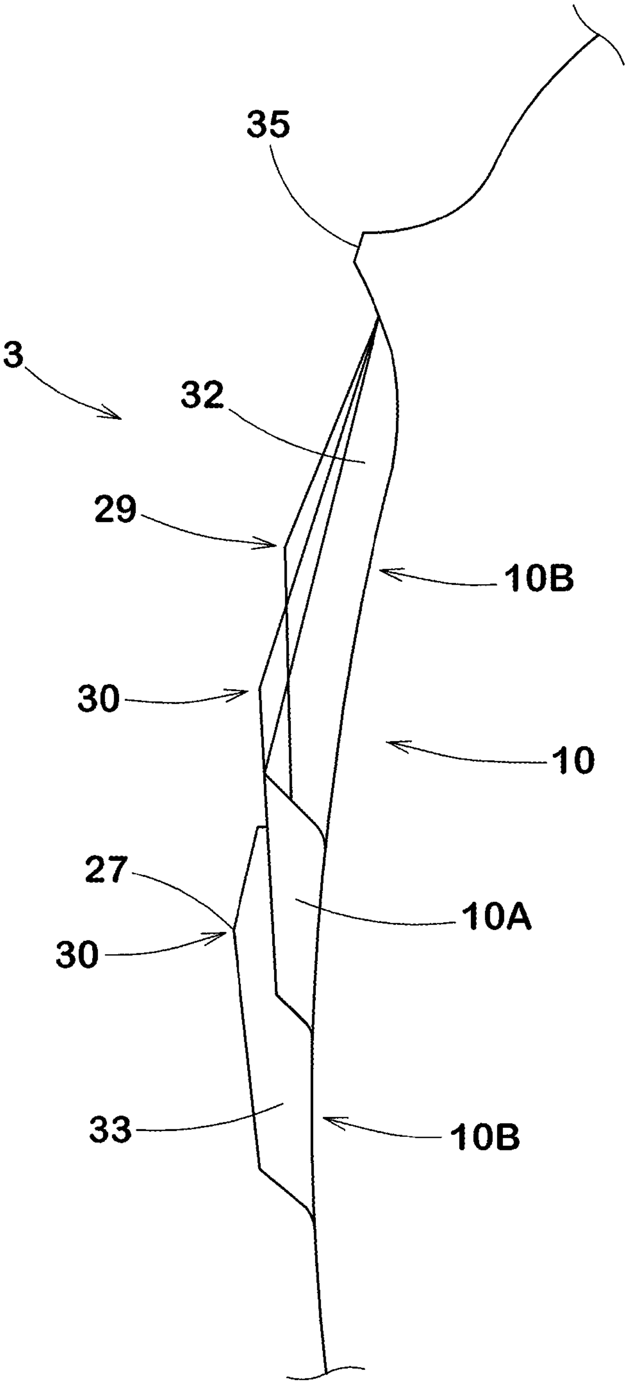
FIG. 6 a diagram in which a cross-section taken along A-A line, a cross-section taken along B-B line, and a cross-section taken along C-C line of FIG. 5 are superimposed.

FIG. 6 is a line sectional view for explaining the angle changing surface portions 27 obtained by superimposing cross-sections taken along A-A line, B-B line, and C-C line of FIG. 5. As shown in FIG. 6, the second angle changing surface portion 30 of the first protector (10A) is displaced in the tire radial direction with respect to the first angle changing surface portion 29 and the second angle changing surface portion 30 of the second protector (10B). In other words, at least three kinds of angle changing surface portions 27 having different height positions in the tire radial direction are formed in the sidewall portions 3 of the present embodiment. The angle changing surface portion 27 configured as such further improve the soil discharging performance. From such a point of view, the first angle changing surface portions 29 and the second angle changing surface portions 30 of the first protectors (10A) may be displaced in the tire radial direction and the first angle changing surface portions 29 and the second angle changing surface portions 30 of the second protectors (10B) may be displaced in the tire radial direction (this embodiment not shown).

As shown in FIG. 4, it is preferred that each of distances (h3) in the tire radial direction between radially outer ends (10*e*) of the side protectors 10 (radially outer ends of the radial surface portions (18A)) and the tread edge (Te) is 10% or less of the tire section height (H) (shown in FIG. 1). If each of the distances (h3) is more than 10% of the tire section height (H), the side protectors 10 become less likely to come into contact with mud, therefore, it is possible that the off-road performance is deteriorated. If the distances (h3) are small, when a large ground contact pressure is applied to portions near the tread edges (Te) such as during cornering or the like, it is possible that large wear is caused due to the side protectors 10 contacting the ground. From such a point of view, it is preferred that each of the distances (h3) is 3% or more of the tire section height (H). The tire section height (H) is a length in the tire radial direction between a bead base line (BL) (shown in FIG. 1) and a radially outer end of the tire 1.

As shown in FIG. 5, the side protectors 10 are provided with cut-out portions 12 and sipes 13 in the present embodiment. The cut-out portions 12 and the sipes 13 moderate the rigidity of the side protectors 10, therefore, the side protectors 10 become easy to deform, thereby, envelope characteristics are increased. As a result, the grooves can effectively catch mud and the like, therefore, the off-road performance is improved. Further, the cut-out portions 12 increase surface area of the side protectors 10 and increase the shearing force against mud and the like, thereby, the off-road performance is further improved. Therefore, the tire 1 of the present embodiment exerts excellent off-road performance.

In the present embodiment, in each of the side protectors 10, the cut-out portion 12 and the sipe 13 face each other via the groove 11, i.e., with the groove 11 therebetween. Thereby, the rigidity of the side protector 10 around the cut-out portion 12 and the sipe 13 is moderated, therefore, excellent envelope characteristics are exerted.

As shown in FIG. 3, the sidewall portions 3 of the present embodiment are provided with a circumferential protrusion 35 extending in the tire circumferential direction and protruding axially outward. The circumferential protrusion 35 has a raised height (h4) larger than those of the side protectors 10, for example. Further, the circumferential protrusion 35 in the present embodiment is formed in an annular shape that is continuous in the tire circumferential direction. The circumferential protrusion 35 configured as such suppresses the tire 1 from sinking deeply into muddy ground, therefore, the off-road performance is improved.

The circumferential protrusion 35 in the present embodiment is formed to have a width (W2) in the tire radial direction smaller than each of the widths (W1) of the grooves 11. The circumferential protrusion 35 is formed in a shape tapered axially outward, for example. It should be noted that the present invention is not limited to the embodiment in which the circumferential protrusion 35 is formed.

The circumferential protrusion 35 of the present embodiment is connected to the side protectors 10. Buttress raised portions 36 are connected to the radially outer side of the circumferential protrusion 35. The buttress raised portions 36 are connected to shoulder blocks 9 divided by tread grooves 8 arranged spaced apart from each other in the tire circumferential direction, for example.

Each of the buttress raised portions 36 in the present embodiment has a pair of buttress wall surfaces (36*a*) spaced apart in the tire circumferential direction and extending in the tire radial direction. Each of the buttress wall surfaces (36*a*) is linearly connected to a respective one of the radial surface portions (18A) via the circumferential protrusion 35, for example. In such an embodiment, the buttress raised portions 36 and the side protectors 10 exert large shearing force on mud and the like.

The buttress raised portions 36 are provided with radial grooves 37 extending in the tire radial direction. Each of the radial grooves 37 is linearly connected to a respective one of the grooves 11 via the circumferential protrusion 35. The radial grooves 37 configured as such increase the edge component of the buttress raised portions 36, therefore, the shearing force is further increased. It should be noted that the buttress raised portions 36 are not limited to such an embodiment.

While detailed description has been made of the tire according to an embodiment of the present invention, the present invention can be embodied in various forms without being limited to the illustrated embodiment.

Working Examples (Examples)

Pneumatic tires having the basic structure shown in FIG. 1 were made by way of test according to the specifications listed in Table 1, and then the test tires were tested for the off-road performance. Common specifications of the test tires and the test methods were as follows.

Tire size: 35×12.50R20LT

Tire rim: 18×7.5J

Tire inner pressure: 260 kPa

Test vehicle: 4WD passenger car with a displacement of 2500 cc

<Off-Road Performance>

The test driver drove the above test vehicle on an off-road test course formed by a muddy road, and evaluated the off-road performance regarding braking force and drive power. The results are indicated by an evaluation point based on Reference 1 being 100, wherein the larger the numerical value, the better the off-road performance is. It should be noted that in "Shape of Groove" in Table 1, "A" means an embodiment in which the grooves of the first protectors and the second protectors have the first inclined groove portions, and "B" means an embodiment in which the grooves of the first protectors have the first inclined groove portions and the grooves of the second protectors have the second inclined groove portions. Further, in "Shape of Angle changing surface portion" in Table 1, "A" means an embodiment in which the first angle changing surface portions and the second angle changing surface portions are provided, and "B" means an embodiment in which only the first angle changing surface portions are provided on both sides of the grooves.

TABLE 1

| | Ref. 1 | Ex. 1 | Ex. 2 | Ex. 3 |
|---|---|---|---|---|
| Shape of Groove | A | B | B | B |
| Presence or Absence of Angle changing surface portion | Presence | Absence | Presence | Presence |
| Shape of Angle changing surface portion | A | — | A | B |
| Off-road performance [Evaluation point: larger numerical value is better] | 100 | 110 | 120 | 115 |

From the test results, it can be confirmed that the tires in Examples have better off-road performance than the tires in the Reference. Further, a test was performed by using tires having different tire sizes, and the same result was obtained. Furthermore, when the first angle ($\alpha 1$) of the outer surface portion was larger than 80 degrees, it became necessary to add vent lines.

DESCRIPTION OF REFERENCE SIGNS

1 pneumatic tire
2 tread portion
3 sidewall portion
10 side protector
10A first protector
10B second protector
11 groove
14 first inclined groove portion
15 second inclined groove portion

The invention claimed is:

1. A pneumatic tire comprising a tread portion and a pair of sidewall portions each extending inward in a tire radial direction from the tread portion, wherein at least one of the pair of the sidewall portions is provided with side protectors protruding outward in a tire axial direction and arranged in a tire circumferential direction, each of the side protectors is provided with a groove, the groove includes a first inclined groove portion inclined to a first side with respect to the tire radial direction, or a second inclined groove portion inclined to a second side opposite to the first side with respect to the tire radial direction, the side protectors include first protectors each provided with the first inclined groove portion, and second protectors each provided with the second inclined groove portion, in a tire meridian section passing through a tire rotational axis, each of the side protectors has an outer surface including an outer surface portion, an inner surface portion, and an angle changing surface portion, the outer surface portion extends at a first angle with respect to the tire axial direction, the inner surface portion is arranged radially inside the outer surface portion and extends at a second angle different from the first angle, and the angle changing surface portion connects the outer surface portion and the inner surface portion, and has an angle changing between them with respect to the tire radial direction, wherein the first angle is 60 degrees or more and 80 degrees or less, and the second angle is 85 degrees or more and 100 degrees or less.

2. The pneumatic tire according to claim 1, wherein the first protectors and the second protectors are arranged alternately.

3. The pneumatic tire according to claim 1, wherein a distance in the tire radial direction between a radially outer end of each of the side protectors and a tread edge is 3% or more and 10% or less of the tire section height.

4. The pneumatic tire according to claim 1, wherein each of angles of the first inclined groove portion and the second inclined groove portion is 30 degrees or more and 60 degrees or less with respect to the tire radial direction.

5. The pneumatic tire according to claim 1, wherein a depth of the groove is 50% or more and 100% or less of a rising height of each of the side protectors.

6. The pneumatic tire according to claim 1, wherein the angle changing surface portion has a radius of curvature of less than 10 mm, and each of the outer surface portion and the inner surface portion has a radius of curvature of 50 mm or more.

7. The pneumatic tire according to claim 1, wherein the groove includes an outer groove portion arranged radially outside the first inclined groove portion or the second inclined groove portion, and the outer groove portion has an angle smaller than the first inclined groove portion and the second inclined groove portion with respect to the tire radial direction.

8. The pneumatic tire according to claim 7, wherein the outer groove portion is connected with the first inclined groove portion or the second inclined groove portion in a bent manner.

9. The pneumatic tire according to claim 7, wherein the outer groove portion is provided in a central portion of the side protector in the tire circumferential direction.

10. The pneumatic tire according to claim 7, wherein the angle of the outer groove portion is 10 degrees or less.

11. The pneumatic tire according to claim 1, wherein the angle changing surface portion includes a first angle changing surface portion and a second angle changing surface portion having a radial position different from the first angle changing surface portion, and the groove extends between the first angle changing surface portion and the second angle changing surface portion.

12. The pneumatic tire according to claim 11, wherein a radial distance between the first angle changing surface portion and the second angle changing surface portion is 10% or more and 50% or less of each of radial lengths of the side protectors.

13. The pneumatic tire according to claim 11, wherein the groove includes an outer groove portion arranged radially outside the first inclined groove portion or the second inclined groove portion, and a bent portion connecting the outer groove portion and the first inclined groove portion or the second inclined groove portion, the first angle changing surface portion or the second angle changing surface portion is arranged at the same height position in the tire radial direction as the bent portion.

14. The pneumatic tire according to claim 11, wherein the second angle changing surface portion of each of the first protectors is displaced in the tire radial direction with respect to the first angle changing surface portion and the second angle changing surface portion of each of the second protectors.

15. The pneumatic tire according to claim 1, wherein each of the side protectors includes a V-shaped inner edge protruding radially inward.

16. The pneumatic tire according to claim 15, wherein the groove is connected with the inner edge.

17. The pneumatic tire according to claim 15, wherein the inner edge includes a first edge portion inclined to the first side with respect to the tire radial direction and a second edge portion inclined to the second side with respect to the tire radial direction, and the first inclined groove portion is connected with the second edge portion.

18. The pneumatic tire according to claim 17, wherein the second inclined groove portion is connected with the first edge portion.

* * * * *